March 22, 1938.   D. W. SHERMAN   2,111,696
SHOCK ABSORBER MOUNTING FOR AUTOMOBILES
Filed Nov. 30, 1936
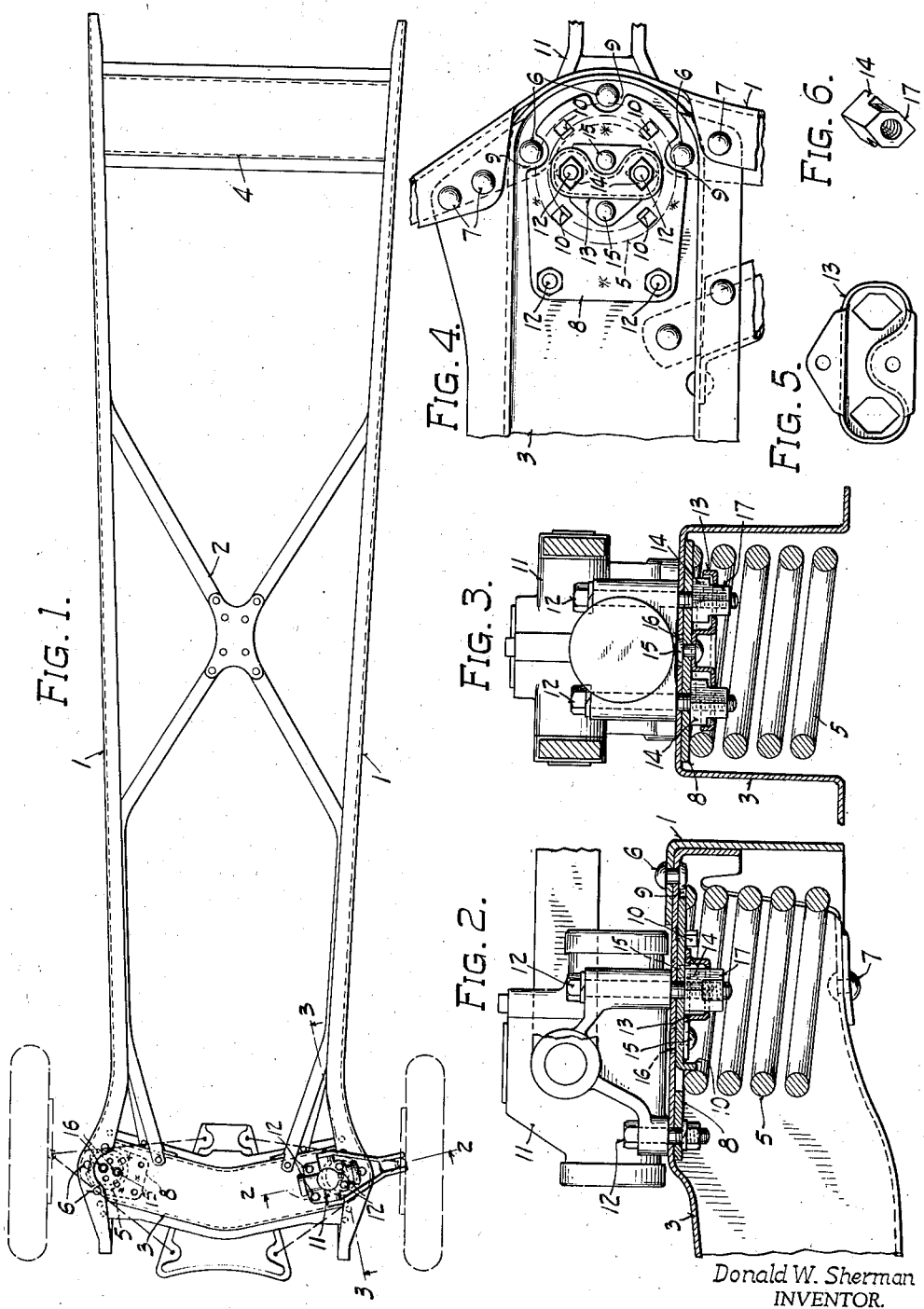
Donald W. Sherman
INVENTOR.
BY
ATTORNEY.

Patented Mar. 22, 1938

2,111,696

UNITED STATES PATENT OFFICE 2,111,696

SHOCK ABSORBER MOUNTING FOR AUTOMOBILES

Donald W. Sherman, Shorewood, Wis., assignor to A. O. Smith Corporation, Milwaukee, Wis., a corporation of New York Application November 30, 1936, Serial No. 113,342

6 Claims. (Cl. 280—106)

This invention relates to a shock absorber mounting for automobiles, and more particularly to the reenforcing and construction of the frame of an automobile at the forward end for supporting the shock absorber. It has been applied to frames of the type set forth in Patent No. 1,965,561 issued to the present inventor and more particularly it has been used where, in assembling the automobile, the chassis at its forward end is mounted on independent coil springs prior to the attachment of the shock absorbers.

The invention is illustrated in the accompanying drawing in which:

Figure 1 is a top plan view of the automobile frame with a shock absorber attached thereto;

Fig. 2 is a detail transverse section on line 2—2 of Fig. 1;

Fig. 3 is a detail section taken at right angles to Fig. 2 on line 3—3 of Fig. 1;

Fig. 4 is a bottom plan view of the reenforcing plate secured in place;

Fig. 5 is a top plan view of the nut holder; and

Fig. 6 is a perspective view of the nut.

The automobile frame generally comprises two channel side rails 1, a central X cross member 2, a forward cross member 3 and a suitable rear cross member 4. The forward cross member 3 is of inverted channel type having its respective ends curved to provide a space for receiving a coil spring 5 for independently mounting the forward wheels. The side rails 1 are curved laterally at their forward ends to receive the ends of the cross member 3 and accommodate the springs 5. The action of the springs 5 is dampened by means of shock absorbers attached on the member 3 at the center of the top end of the coil springs 5.

The member 3 is formed of sheet metal having its side and end edges turned downwardly for a substantial depth and the side edges flanged outwardly at the bottom on the front and rear sides of the member. The channel side rail 1 is attached to the end of the member 3 by means of rivets 6 which secure the upper flange of the rail to the upper horizontal web of the member 3, and by means of rivets 7 which secure the lower flange of the rail to the lower flanges of the member 3.

The upper horizontal web of the member 3 is reenforced by a plate 8 which is approximately of the same or greater thickness than the flat heads of rivets 6 and which has its edges recessed as at 9 to receive the heads of the rivets 6. Ears 10 are struck downwardly from the plate 8 to define the position of the upper end of the coil spring 5, which latter seats against the plate 8.

The reenforcing plate 8 is preferably spot welded to the web of member 3, although it may be riveted or otherwise secured thereto.

The shock absorber 11 is mounted on the member 3 by means of four bolts 12 passing downwardly through the base of the shock absorber and through the web of member 3 and the plate 8. The bolts 12 have to be very accurately positioned. Two of the bolts 12 pass through the member 3 at points outside the seat of the coil spring 5 while the other two bolts 12 pass through the member 3 near the center of the seat of the coil spring. The assembling of the latter two bolts after the chassis frame has been mounted on the springs presents a problem.

To facilitate assembly, the invention provides a special retainer 13 for holding special nuts 14 beneath the reenforcing plate 8. This retainer 13 is formed of sheet metal and is secured by rivets 15 to the plate 8, holes 16 being provided in member 3 to receive the flat heads of the rivets. The retainer 13 is formed with two cup-shaped sections at either end for receiving the square heads of threaded nuts 14. Each nut 14 has a body portion 17 from which two of the corners have been machined off. The portion 17 of each nut 14 drops into a complementary hole in the bottom of the retainer 13 as shown and allows limited lateral movement of the nut to effect alignment of the same with the respective bolt 12 during assembly.

The nut retainer 13 holds the nuts 14 in place should the shock absorber be removed for any reason so that it can be reassembled without difficulty. The nuts 14 are held against rotation by their special non-circular shape, it being understood that they may have any suitable shape for this purpose.

Various embodiments of the invention may be employed within the spirit and scope of the invention as set forth in the claims.

The invention is claimed as follows:

1. In an automobile in which the chassis frame is independently sprung from the forward wheels by means of coil springs, a chassis frame having a forward cross bar providing a substantially horizontal web adapted to seat upon the coil spring, rivets securing said web to the side rail of the frame, a reenforcing plate secured to the under side of said web and having recesses in its edges for receiving the heads of said rivets, said reenforcing plate having a thickness sufficient to prevent the spring from engaging and injuring the heads of said rivets, and means for defining a seat for said coil spring when in engagement with said plate.

2. In an automobile in which the chassis frame is independently sprung from the forward wheels by means of coil springs, a chassis frame having a forward cross bar providing a substantially horizontal web adapted to seat upon the coil spring, rivets securing said web to the side rail of the frame, a reenforcing plate secured to the under side of said web and having recesses in its edges for receiving the heads of said rivets, said reenforcing plate having a thickness sufficient to revent the spring from engaging and injuring the heads of said rivets, means for defining a seat for said coil spring when in engagement with said plate, and means for securing a shock absorber bracket on said web directly above said coil spring.

3. In an automobile in which the chassis frame is independently sprung from the forward wheels by means of coil springs, a chassis frame having a forward cross bar providing a substantially horizontal web adapted to seat upon the coil spring, rivets securing said web to the side rail of the frame, a reenforcing plate secured to the under side of said web and having recesses in its edges for receiving the heads of said rivets, said reenforcing plate having a thickness sufficient to prevent the spring from engaging and injuring the heads of said rivets, means for defining a seat for said coil spring when in engagement with said plate, means for securing a shock absorber bracket on said web directly above said coil spring, said last named means including a pair of threaded nuts, and means for retaining the nuts in floating non-rotating position for assembly purposes.

4. In an automobile in which the chassis frame is independently sprung from the forward wheels by means of coil springs, a chassis frame having a forward cross bar providing a substantially horizontal web adapted to seat upon the coil spring, rivets securing said web to the side rail of the frame, a reenforcing plate secured to the under side of said web and having recesses in its edges for receiving the heads of said rivets, said reenforcing plate having a thickness sufficient to prevent the spring from engaging and injuring the heads of said rivets, means for defining a seat for said coil spring in engagement with said plate, means for securing a shock absorber bracket on said web directly above said coil spring, said last named means including a pair of threaded nuts, and means for retaining the same in floating non-rotating position within the space beneath said plate centrally of said coil spring for assembly purposes.

5. In a structure of the class described, a plate having an accurately positioned hole therein, a sheet metal member attached to one side of said plate and having a cupped portion forming a nut-retaining chamber with said plate, said member having a non-circular hole in the bottom of the cupped member in substantial alignment with the hole in said plate, and a nut having its head retained in said chamber and having a non-circular shank complementary to the hole in said member and extending into the same to prevented rotation of the nut.

6. In a structure of the class described, a chassis frame having a web portion having an accurately positioned hole therein, a sheet metal member attached to one side of said web and having a cupped portion forming a nut-retaining chamber with said web, said member having a non-circular hole in the bottom of the cupped member in substantial alignment with the hole in said web, and a nut having its head retained in said chamber and having a non-circular shank complementary to the hole in said member and loosely fitting therein to prevent rotation of the nut and to allow the nut to be aligned accurately with the hole in said web.

DONALD W. SHERMAN.